US007953626B2

(12) United States Patent
Wright et al.

(10) Patent No.: US 7,953,626 B2
(45) Date of Patent: May 31, 2011

(54) SYSTEMS AND METHODS FOR ASSESSING AND TRACKING OPERATIONAL AND FUNCTIONAL PERFORMANCE

(75) Inventors: Ann C. Wright, Washington, DC (US); Justin P. Parke, Washington, DC (US)

(73) Assignee: United States Postal Service, Washington, DC (US)

( * ) Notice: Subject to any disclaimer, the term of this patent is extended or adjusted under 35 U.S.C. 154(b) by 87 days.

(21) Appl. No.: 10/954,789

(22) Filed: Sep. 30, 2004

(65) Prior Publication Data

US 2005/0154635 A1 Jul. 14, 2005

Related U.S. Application Data

(60) Provisional application No. 60/526,444, filed on Dec. 4, 2003.

(51) Int. Cl.
*G06Q 10/00* (2006.01)
*G06Q 10/40* (2006.01)

(52) U.S. Cl. ........................................ 705/7.39; 705/7.37
(58) Field of Classification Search .................. 705/7.39
See application file for complete search history.

(56) References Cited

U.S. PATENT DOCUMENTS

| | | | | |
|---|---|---|---|---|
| 5,734,890 A * | 3/1998 | Case et al. | ............ | 707/5 |
| 5,909,669 A * | 6/1999 | Havens | ............ | 705/11 |
| 6,338,042 B1 * | 1/2002 | Paizis | ............ | 705/11 |
| 6,556,974 B1 * | 4/2003 | D'Alessandro | ............ | 705/10 |
| 6,604,084 B1 * | 8/2003 | Powers et al. | ............ | 705/11 |
| 6,681,197 B2 * | 1/2004 | Brunner et al. | ............ | 702/182 |
| 6,877,034 B1 * | 4/2005 | Machin et al. | ............ | 709/223 |
| 6,952,679 B1 * | 10/2005 | Pulford | ............ | 705/7 |
| 7,337,120 B2 * | 2/2008 | Andrus et al. | ............ | 705/1 |
| 7,359,865 B1 * | 4/2008 | Connor et al. | ............ | 705/10 |
| 2002/0055900 A1 * | 5/2002 | Kansal | ............ | 705/37 |
| 2002/0072953 A1 * | 6/2002 | Michlowitz et al. | ............ | 705/10 |
| 2002/0091498 A1 * | 7/2002 | Brunner et al. | ............ | 702/182 |
| 2003/0033233 A1 * | 2/2003 | Lingwood et al. | ............ | 705/36 |
| 2003/0035506 A1 * | 2/2003 | Tybinkowski et al. | ............ | 378/4 |
| 2003/0097296 A1 * | 5/2003 | Putt | ............ | 705/11 |

(Continued)

OTHER PUBLICATIONS

"CorVu's Business Performance Management Solution". CorVu Corporation. archived Jan. 19, 1998. accessed at: <http://www.corvu.com/scard/product.htm>.*

(Continued)

*Primary Examiner* — Peter Choi
(74) *Attorney, Agent, or Firm* — Finnegan, Henderson, Farabow, Garrett & Dunner, LLP

(57) ABSTRACT

Methods and systems for assessing and tracking operational and functional performance can include compiling performance data for an entity (e.g., an entire enterprise, a corporate business unit, a particular operational region, a particular position, a particular employee, etc.) corresponding to a plurality of indicators corresponding to at least one goal category. The method may further include weighting the performance data corresponding to the plurality of indicators for the entity and generating a performance score for the entity based on the weighted or un-weighted performance data. Another method for assessing performance of at least one entity can be based on a first set of indicators and a second set of indicators reflecting performance of the entity. The method may also include generating goal achievement data for the first set of indicators and the second set of indicators and, based on the generated goal achievement data, generating a summary or composite goal achievement data for the first set of indicators and the second set of indicators by weighting the generated goal achievement data.

28 Claims, 16 Drawing Sheets

U.S. PATENT DOCUMENTS

2003/0149613 A1* 8/2003 Cohen et al. .................... 705/11
2003/0225610 A1* 12/2003 Doyle ............................ 705/11
2004/0039631 A1* 2/2004 Crockett et al. ................ 705/11

OTHER PUBLICATIONS

"Automating The Balanced Scorecard". CorVu Corporation. archived Apr. 25, 1998. accessed at: <http://corvu.com/papers/bsc.htm>.*

Voskamp, Leo. "Going from the Unacceptable to Exceptional: The How and Why of Balanced Scorecarding". Oct. 2003.*

Fitzpatrick, Melissa A. "Let's bring balance to health care". Mar. 2003. Nursing Management. vol. 33, Issue 3. pp. 35-37.*

Lipe, Marlys Gascho; Salterio, Steven E. "The Balanced Scorecard: Judgemental Effects of Common and Unique Performance Measures". Jul. 2000. The Accounting Review. vol. 75, Issue 3. pp. 283-298.*

Tarantino, David P. "Using the Balanced Scorecard as a Performance Management Tool". Sep.-Oct. 2003. The Physician Executive. vol. 29, Issue 5. pp. 69-72.*

Notification of Transmittal of the International Search Report and the Written Opinion of the International Searching Authority, or the Declaration, PCT International Search Report, and Written Opinion of the International Searching Authority.

* cited by examiner

SYSTEMS AND METHODS FOR ASSESSING AND TRACKING OPERATIONAL AND FUNCTIONAL PERFORMANCE

CROSS-REFERENCE TO RELATED APPLICATIONS

This application claims the benefit of priority from U.S. Provisional Application No. 60/526,444 filed on Dec. 4, 2003 to Wright et al. and entitled "Systems and Methods for Assessing and Tracking Operational and Functional Performance," which is incorporated herein by reference in its entirety (including all exhibits) and for all purposes.

BACKGROUND OF THE INVENTION

1. Field of the Invention

This invention generally relates to the field of management systems and methods. More particularly it relates to systems and methods for assessing and tracking operational and functional performance.

2. Description of the Related Art

Effective management of an organization includes proper assessment and tracking of the operational and functional performance of various entities at various levels within the organization, including, for example, the various positions within the organization (e.g., president, vice president, manager, supervisor, laborer, etc.) at various locations, and the various corporate units, and/or plants at different levels of the organization (e.g., company, division, region, department, etc). Traditionally, organizations have relied on annual or bi-annual reviews to track and assess performance of the various entities or positions at different levels of the organization. Such reviews, however, often fail to provide high-level management with a clear view of the success or failure of the organization, and thus the various positions, in achieving critical business objectives. For example, such systems may not provide for any objective or timely assessment of the performance of the various positions at the various levels of the organization.

Moreover, in a large enterprise performance assessment and tracking data may be processed using different legacy applications and systems, which can prevent high-level managers or executives of the enterprise from developing a uniform enterprise wide performance assessment and tracking system. Indeed, because the disparate legacy systems and databases within the enterprise may not share data or processes with each other, the enterprise leadership may be forced to evaluate similarly positioned executives or managers at different business units using different evaluation criteria. Further, performance assessment and tracking systems typically suffer from a widely varying and subjective grading system. Different reviewers can have significantly different ideas of what a "good" employee or metric is as compared to a "very good" employee or metric. These can result in a non-uniform or unfair compensation system, which may, for example, overcompensate some executives while under-compensating others. Although one might manually combine information from these disparate systems into an enterprise wide system with a standard measurement system, such manual operations are cumbersome, error prone, and, for very large enterprises, virtually impossible.

Traditional operational and performance tracking systems can not provided easy access to enterprise wide performance and tracking data. For example, the enterprise leadership may not be able to preview and validate business unit or executive performance data before an evaluation is given. Further, the performance of executives at various positions and levels within the organization may not be measured by the same yardstick. Specifically, for example, higher corporate officers may need to be evaluated based on the performance of the entire corporate entity, while lower level executives may need to be evaluated based on individual/unit indicators.

Thus, current systems and methods for assessing and tracking operational and functional performance are inadequate, error prone or impossible for effective management of an enterprise. Accordingly, there is a need for effective systems and methods for assessing and tracking operational and functional performance.

SUMMARY OF THE INVENTION

Consistent with embodiments of the invention, systems and methods for assessing and tracking operational and functional performance are provided. In one embodiment, a method and system for assessing operational and functional performance of an organization is provided. The method and system may include compiling performance data for an entity (e.g., an entire enterprise, a corporate business unit, a particular operational region, a particular position, a particular employee, etc.) corresponding to a plurality of indicators, where each indicator corresponds to at least one goal category for an organization. The method and system may include scaling the compiled performance data corresponding to the plurality of indicators for the at least one entity. The method and system may further include weighting the scaled performance data corresponding to the plurality of indicators for the entity. The method and system may include generating a performance score for the entity based on the weighted or un-weighted performance data. The method and system may also include allowing a plurality of users direct access to the performance scorecard substantially immediately after it is generated. The method and system may alternatively include adjusting the pay (e.g., salary, bonus, etc.) of at least one of the plurality of users based on the performance scorecard. This exemplary method and system can be performed utilizing a widely dispersed and networked, enterprise computer system.

In another embodiment, a method and system for assessing performance of at least one entity within an organization is based on a first set of indicators corresponding to a first set of organization goals and a second set of indicators corresponding to a second set of organization goals, each indicator reflecting performance of the at least one entity. This embodiment can include compiling goal achievement data for the first and second sets of indicators associated with the at least one entity and scaling the compiled goal achievement data corresponding to the at least one entity. This embodiment can further include weighting the scaled goal achievement data for the first set of indicators relative to each other, weighting the scaled goal achievement data for the second set of indicators relative to each other, and weighting the first and second sets of organization goals relative to the second and first sets of organization goals, respectively. This embodiment can also include generating a composite goal achievement data based on the weighted first set of indicators, the weighted second set of indicators and the weighted first and second sets of organization goals and allowing a plurality of users direct access to the composite goal achievement data substantially immediately after it is generated. This embodiment may alternatively include adjusting the pay (e.g., salary, bonus, etc.) of at least one of the plurality of users based on the composite goal achievement data. This exemplary method and system can be performed utilizing a widely dispersed and networked, enterprise computer system.

In another embodiment, a method and system can compare a relative performance of a first and second entity within an organization. This embodiment can include compiling first and second performance data for the first and second entity, respectively, where the first and second performance data corresponds to a plurality of indicators and each indicator corresponds to at least one goal category for the organization. This embodiment can also include scaling the compiled first and second performance data corresponding to the plurality of indicators for the first and second entity, respectively, and weighting the scaled first and second performance data corresponding to the plurality of indicators for the first and second entity, respectively. This embodiment can further include generating a first and second performance scorecard for the first and second entity, respectively, based on the weighted first and second performance data, respectively, and producing a comparison scorecard based on the generate first and second performance scorecards. Finally, this embodiment can include allowing a plurality of users direct access to the comparison scorecard substantially immediately after it is produced. This embodiment may alternatively include adjusting the pay (e.g., salary, bonus, etc.) of at least one of the plurality of users based on the comparison scorecard. This exemplary method and system can be performed utilizing a widely dispersed and networked, enterprise computer system.

It is to be understood that both the foregoing general description and the following detailed description are exemplary and explanatory only and are not meant to be restrictive of the invention as claimed.

BRIEF DESCRIPTION OF THE DRAWINGS

These and other aspects and features of the present invention will become apparent to those ordinarily skilled in the art upon review of the following detailed description of specific embodiments of the invention in conjunction with the accompanying figures, wherein.

DETAILED DESCRIPTION OF THE INVENTION

Figure 1:
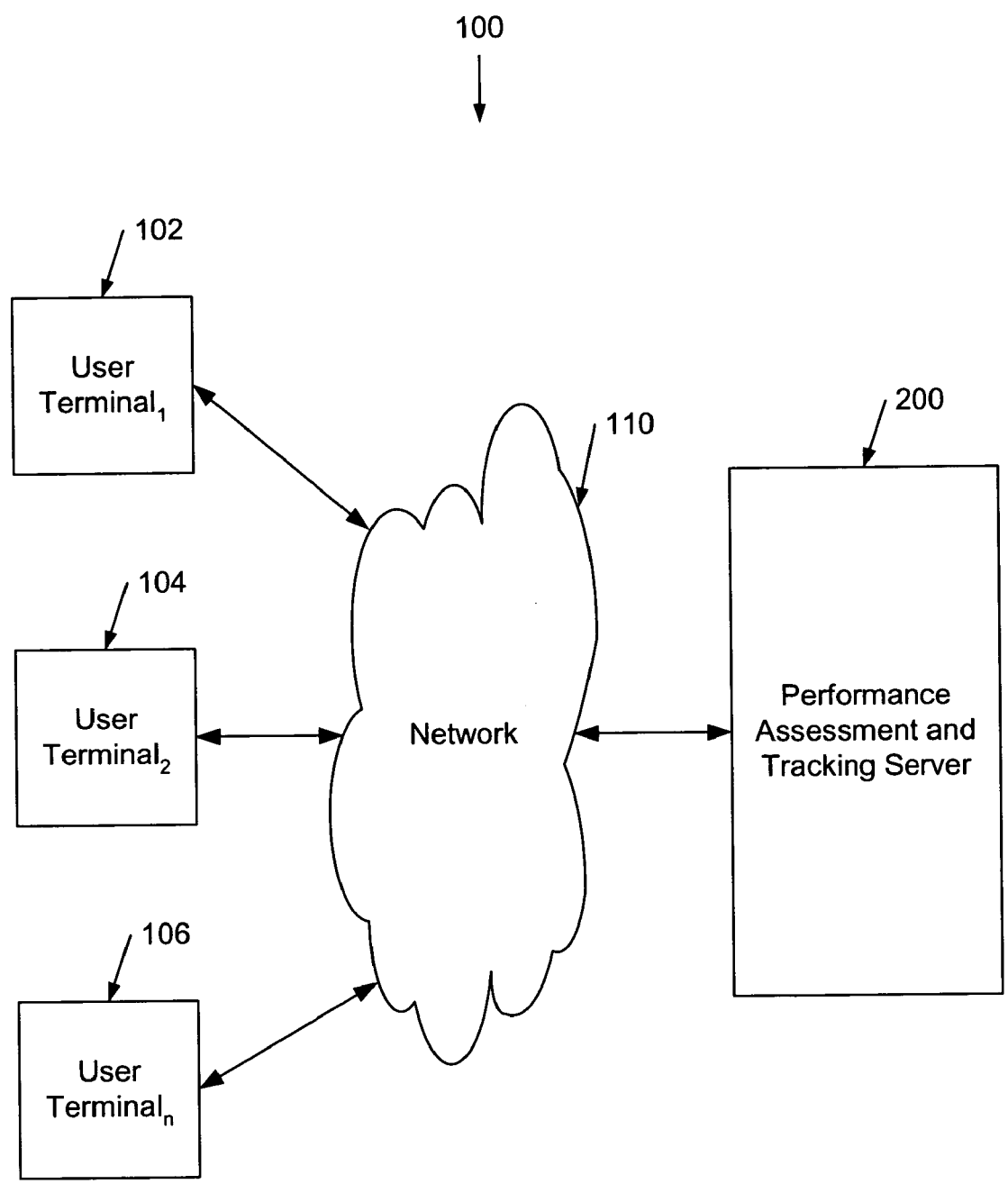
FIG. 1 is a block diagram illustrating an exemplary system environment for assessing and tracking performance, consistent with embodiments of the present invention.

The invention will now be described in detail with reference to the drawings, which are provided as illustrative examples of the invention so as to enable those skilled in the art to practice the invention. Notably, the figures and examples described below are not meant to limit the scope of the present invention. Wherever possible, the same reference numbers will be used throughout the drawings to refer to the same or like parts.

Where certain elements of the invention can be partially or fully implemented using components known in the art, only those portions of such known components that are necessary for an understanding of the present invention will be described. The detailed descriptions of other portions of such known components will be omitted so as not to obscure the invention. Further, the present invention is meant to encompass present and future known equivalents to the exemplary components referred to herein.

The disclosed performance assessment and tracking system can include a plurality of user terminals connected via a network, such as a local area network, an intranet and/or the Internet, to a performance assessment and tracking server. The network can be wired, wireless or any combination thereof. The performance assessment and tracking server can include at least one database containing performance data. As used herein, a database can include a single database structure with many related tables and fields operating on a single computer or a plurality of database structures with many related and interrelated tables and fields operating on a plurality of networked computers. The performance assessment and tracking server can poll other databases or other servers throughout the network to obtain relevant data and criteria.

Performance data can include information corresponding to various indicators that may be used to measure performance. Indicators can include any combination of corporate indicators, unit indicators and/or individual indicators. Indicator values for corporate, unit and individual indicators may be calculated based on specific business rules, which are discussed in more detail below. By way of non-limiting examples, the Appendix, which is attached as part of this application and incorporated herein by reference, describes various corporate, unit and individual indicators consistent with the systems and methods of embodiments of the present invention.

The performance assessment and tracking server can further include at least one performance assessment and tracking application, which may include various software modules which, when executed by a computer, provide various functionality associated with the performance assessment and tracking systems and methods. A user with valid and proper authority may access the performance assessment and tracking server in a secure fashion to correct performance data. For example, a user, such as a system administrator, may log into the system with supervisory access to correct performance data errors. While, for data integrity reasons, it would be non-optimal to allow for too much authority to add, edit, delete or otherwise alter the performance data, such hypothetical functionality is not outside the scope of the invention.

FIG. 1 illustrates an exemplary system environment 100 for performance assessment and tracking, consistent with embodiments of the present invention. A user terminal$_1$ 102, a user terminal$_2$ 104, and a user terminal$_n$ 106 may be connected via a network 110 to a performance assessment and tracking server 200. Without limitation, one skilled in the art will appreciate that any type/number of user terminals may be connected via any type/number of networks to any type/number of performance assessment and tracking servers. For example, network 110 may be any appropriate wired or wireless (or combination) network, such as, for example, an enterprise local area network (e.g., intranet, extranet, etc.) or a public network (e.g. the Internet, etc.). Additionally, network 110 may utilize any suitable type of network protocol. While reference will be made throughout this disclosure to specific networks, such as the Internet or an intranet, it should be understood that the network 110 is not so limited.

User terminal$_1$ 102 may be any appropriate type of a user terminal, such as, for example, a desktop computer, a laptop computer, a handheld computer, a personal digital assistant (PDA), and the like. User terminal$_1$ 102 may also execute a network browser-type program, such as, for example, Microsoft Internet Explorer, Netscape Navigator, Opera, Mosaic, and the like. Accordingly, user terminal$_1$ 102 may include a processor, memory, storage, and an interface for connecting to network 110. In an exemplary embodiment, a user, such as a manager, supervisor, executive or director of the enterprise, using user terminal$_1$ 102 with a network browser-type application, may connect via network 110 to performance assessment and tracking server 200. After logging into the performance assessment and tracking server, the user may then navigate through the performance assessment and tracking system to the desired functionality (e.g., setting corporate goals, reviewing performance results, etc.). For example, a user may select to connect to network 110 using a web browser, such as Internet Explorer, by entering a uniform resource locator (URL) that identifies the performance assessment and tracking server 200.

Figure 2:
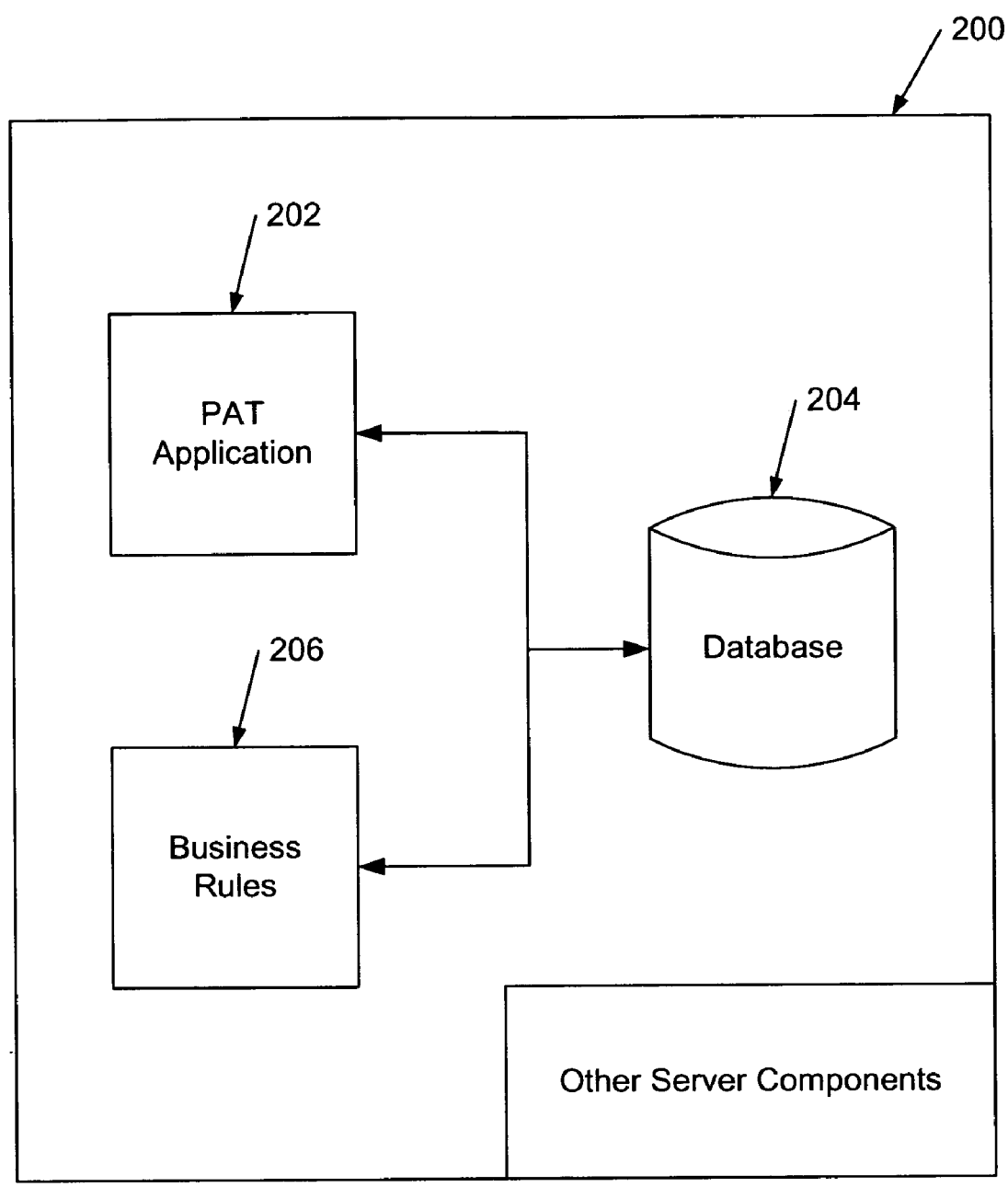
FIG. 2 is a block diagram illustrating an exemplary performance assessment and tracking server, consistent with embodiments of the present invention.

FIG. 2 is a block diagram illustrating an exemplary performance assessment and tracking server 200, consistent with embodiments of the present invention. As shown, the embodiment of performance assessment and tracking server 200 may include a performance assessment and tracking (PAT) application 202, a database 204, and business rules 206. As will be evident to those skilled in the art upon review of this disclosure, these elements may be combined, shared or divided without deviating form the scope of the invention. PAT application 202 may include software modules, that, when executed by a processor of server 200, are capable of performing various functions associated with performance assessment and tracking server 200. One skilled in the art will appreciate that PAT application 202 may be implemented using any suitable programming language and environment. One skilled in the art will also appreciate that components of PAT application 202 may reside on performance assessment and tracking server 200, other servers or computers, or on user terminals, such as user terminal$_1$ 102.

Database 204 may include a wide variety of data relevant to performance assessment and tracking. By way of a non-limiting example, all data elements described herein or that could be accessed via screens, printed in reports, and any underlying data elements that are shown in the Figures included as part of this specification, including the Appendix, may be stored in database 204. Further, other metadata, such as business intelligence and data modeling tools, packaged applications, and messaging technologies that may also be accessed by PAT application 202 can be stored in database 204. One skilled in the art will appreciate that database 204 is exemplary and relevant data may be stored in one or more databases, which may be located on other computers, servers, or user terminals. Business rules 206 may include logic corresponding to various rules that may be used to determine values and/or weights for various indicators, discussed in further detail below. By way of non-limiting examples, such rules are described in the attached Appendix. In one embodiment, data/applications stored in various enterprise-wide systems may be accessed by PAT application 202 and delivered to users using a data integration platform, such as, for example, the one available from Informatica Corporation of Redwood City, Calif.

Further, various application program interfaces (APIs), such as, for example, the Windows API, may be used with PAT application 202 to perform various functions associated with the systems and methods corresponding to the embodiments of the present invention. Exemplary APIs can use Java source code comments, which can be generated, for example, using JavaDoc Tool from Sun Microsystems. One skilled in the art will appreciate that any type of Java or non-Java API can be used with the embodiments of the present invention, including for example, remote procedure calls, structured query language commands, file transfer commands, and/or message delivery commands. Of course, APIs may be used alone or in conjunction with other technologies, such as the common object request broker architecture, component object model, and/or distributed computing environment. Application programs used with, or within, PAT application 202 can include, for example, Sun Solaris Server, Visual Source Safe, Microsoft Office Pro, Windows NT Server, Obfuscator, PC Anywhere, Oracle Database, Oracle Application Server, Informatica, SQL Navigator, and the like.

An embodiment of the performance assessment and tracking server 200 (and its component parts) can be available over an enterprise intranet. The PAT application 202 can be available from any user desktop that supports the appropriate network connection and the necessary browser interface. The PAT application 202 of an embodiment can allow users to report on data and information available from within the performance assessment and tracking server 200. Further, users can alternatively access advanced features, which, for example, might include saved private/public slideshows, saved private/public dashboards, setting individual thresholds for dashboard items, email and annotation, and the like. As previously stated, the user computer requires no special software. The performance assessment and tracking server 200 assumes that all users connected to the network are equipped with an appropriate network browser.

In an embodiment, the performance assessment and tracking server 200 can be, for example, hosted on a Microsoft Advanced NT Server v4.0, which can include the PAT application 202. Further, the server 200 can include other support, or backend applications for example, hosted on Sun Solaris Unix servers running Oracle Internet Application Server and Informatica Powercenter. These backend applications can be written in, for example, a Java 1.1 compliant code. The components can run as executable files (e.g., in the JVM) and can be invoked by services to ensure the components are always available. An exemplary list of these backend applications can include a DB Server, a Map Server, Portfolio Server, Download Server, Watchdog Services, Extract Transform and Load (ETL) Services, and so on.

For example, the DB Server of an embodiment can be a middle tier component that is capable of interfacing with the backend client as well as other backend applications. One responsibility of the DB Server can be to retrieve application data for use by PAT application 202. DB Server can have the ability to connect to any database server, for example, one that has an Open Database Connectivity (ODBC) or a Java Database Connectivity (JDBC) driver. For example, DB Server can use a JDBC driver to retrieve data sets from a data application's native data store. A third party vendor can provide the JDBC driver, like, for example, Oracle or Information Builders.

As another example, the Portfolio Server of an embodiment can provide a user with a tree of folders and indicators that make up the application tree. This can be as simple as a set of folders that allow the user to navigate to the data of interest. In addition the Portfolio server can retrieve the private and public folders on Server 200 and from network 110. Because the portfolio server deals with user specific information, it should take care to verify authentication of a user to the requested data. Server 200 can use, for example, Windows NT authentication, rather than create and debug a new authentication engine. This can make it easier to administer PAT application 202. However, a specially created authentication engine can also be used with the invention.

In yet another example, the Download Server of an embodiment can provide a user with the capability to download any data within the system. The download server can have the flexibility of serving the data in a variety of formats including, for example, Word, Excel, Access, Paradox, Acrobat, and so on. The user can download information to a user terminal. The operation of the download server can be by a database program such as, for example, Access 97 Developer Edition. In this example, Access 97 can listen on a TCP/IP port and be fed the information needed retrieve the information and return it in the specified format to the user.

In an embodiment, PAT application 202 can set up watchdog services to make sure the core functions are operating correctly. This can ensure that a particular function does not stop responding for hours due to a network "hiccup" or some other anomaly. Each watchdog service can monitor the specified function slightly differently then the next, but in general all of the watchdog services can behave relatively the same way. For example, a watchdog service can monitor, in this case, the Map Server. If the Map Server writes a file periodically with a date stamp or incremental number, the watchdog service can then read this file and tell if it is different from the previous version of the file. If the two versions are different, then the Map Server can be presumed to be functioning correctly. If they are not different, then the watchdog service can stop the map server and have it reset.

Figure 3:
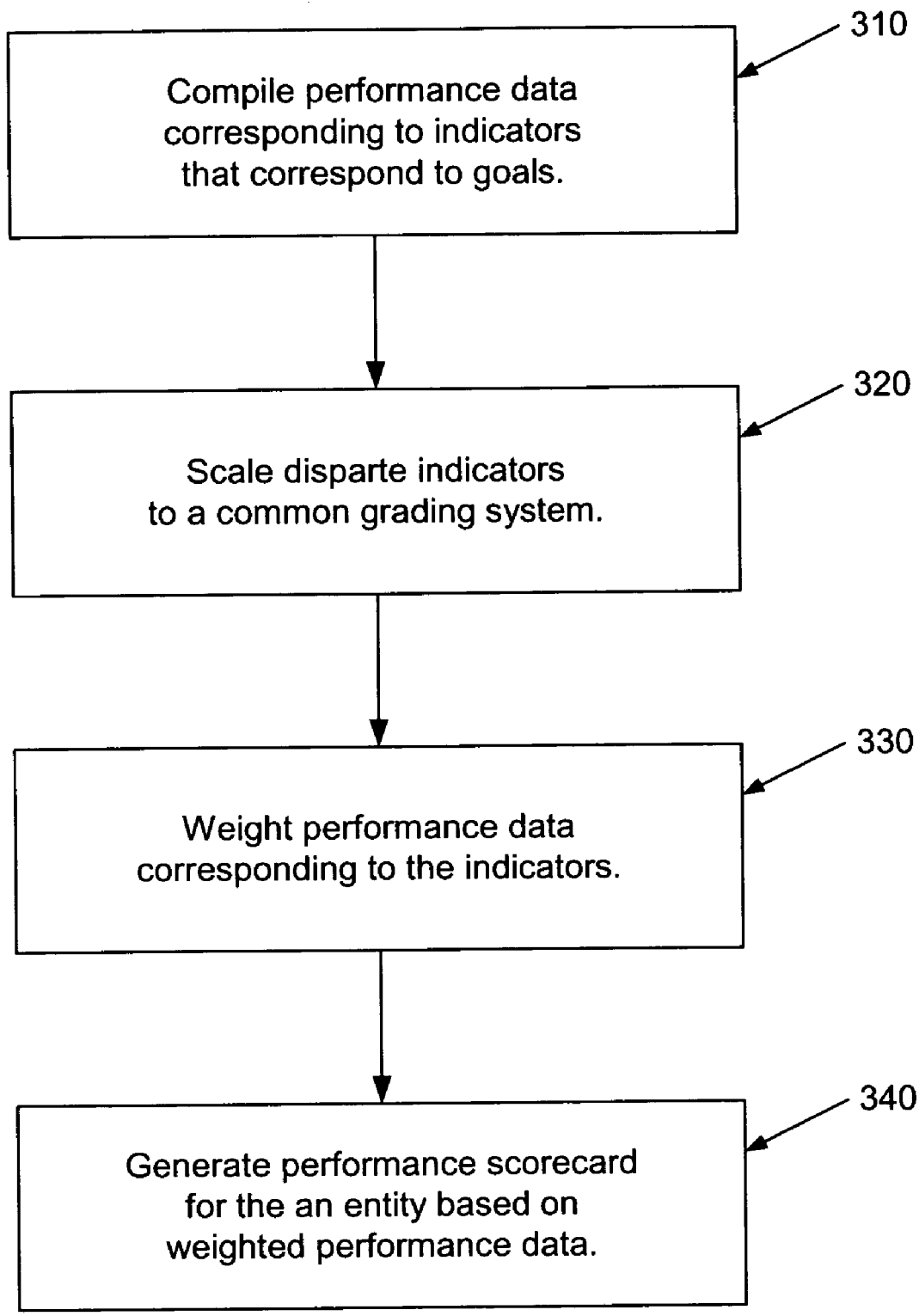
FIG. 3 is a flow diagram illustrating exemplary performance assessment and tracking, consistent with embodiments of the present invention.

FIG. 3 is a flow diagram illustrating exemplary performance assessment and tracking, consistent with embodiments of the present invention. In one embodiment, a method for assessing operational and functional performance of an entity can include compiling performance data for an entity corresponding to a plurality of indicators corresponding to at least one category (step 310). Goal categories can include a corporate goals category, a unit goals category, and a position (or job-specific) goals category. As part of this step, performance data from various sources may be gathered and stored in database 204 of FIG. 2. Thus, for example, data corresponding to various indicators for each of the goal categories may be collected through various sources and stored in database 204. Indicator listings and details can be found in the attached Appendix.

The various indicators for a goal category may be measured at various levels; for example, indicators corresponding to the corporate goals category may be measured at a national level, an area level, and/or at a cluster level. Similarly, indicators corresponding to the unit goals category may be measured at a plant level, a post office level, and/or a district level. Further, indicators corresponding to the position goals category may be measured at a specific position (or job) level. One skilled in the art will appreciate that the aforementioned is merely exemplary and various indicators may be measured or gathered at other levels as well for each of the goals categories.

The next step can involve scaling the compiled data for the various indicators to make them compatible for mutual comparison, summarization and meaningful manipulation. For example, each one of the various indicators may each have its own inherent performance measure, such as an on-time percentage, a failure rate, a go/no-go number and a rating number. To facility comparison and manipulation of these disparately measured indicators, embodiments of the invention can translate (or map) each indicator onto a common scale, for example, a scale of from 1 (lowest) to 15 (highest). This translation or scaling step of the indicators can thus allow for composite scoring of the various indicators.

The next step can involve weighting the performance data corresponding to the plurality of indicators for the entity (step 330). Performance data corresponding to any of the indicators discussed above, including, by way of non-limiting examples, those described in the attached Appendix, can be weighted. In one embodiment, performance data corresponding to the various indicators may be weighted based on the relative priority of the indicators to the enterprise management. The relative priority of the indicators may be determined based on empirical research or value-based judgments. Examples of indicator weightings can be found in the attached Appendix.

The next step can include generating a performance scorecard for the at least one entity based on a calculation using the weighted performance data (step 340). This scorecard can then be used, for example, to help determine an employee's bonus or salary structure adjustments. By way of non-limiting examples, performance scorecard calculations described in the attached Appendix can be generated using the compiled and weighted performance data, including data related to various corporate, unit and individual indicators.

Figure 4:
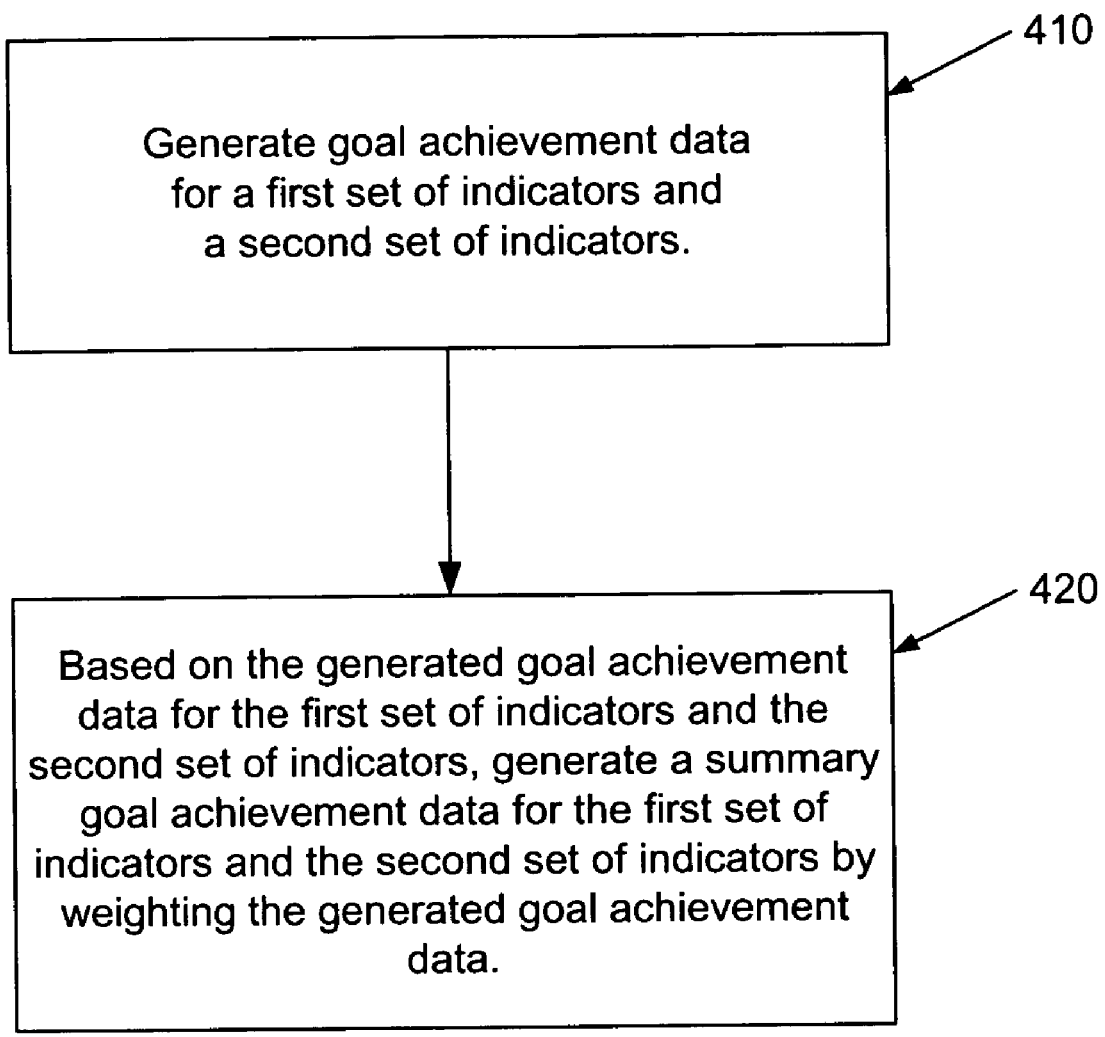
FIG. 4 is a flow diagram illustrating exemplary performance assessment and tracking, consistent with embodiments of the present invention.

FIG. 4 is a flow diagram illustrating exemplary performance assessment and tracking, consistent with embodiments of the present invention. As part of an exemplary method shown in FIG. 4, the first step can include generating goal achievement data for a first set of indicators and a second set of indicators (step 410). Goal achievement data can include any performance data corresponding to the various indicators discussed above and in the attached Appendix. Next, in one embodiment, based on the generated goal achievement data for the first set of indicators and the second set of indicators, a summary or composite goal achievement data for the first set of indicators and the second set of indicators may be generated by weighting the generated goal achievement data (step 420).

In one embodiment, the method may further include weighting the generated goal achievement data for the first set of indicators based on a first relative priority of the first set of indicators and weighting the generated goal achievement data for the second set of indicators based on a second relative priority of the second set of indicators. Further, a weighted average of the goal achievement data for the first set of indicators and second set of indicators may also be generated. Next, a composite weighted average of the goal achievement data for the first set of indicators and the second set of indicators may be generated, as shown below in FIGS. 14 and 16, and as provided in the attached Appendix, for example.

In one embodiment, the first set of indicators may be corporate indicators and the second set of indicators may be individual or unit indicators. Further, in one embodiment, the corporate indicators may include at least one of on-time delivery of priority surface mail, on-time delivery of priority airmail, on-time delivery of express mail, on-time delivery of first class mail, safety performance, employee job satisfaction, and total factor productivity. The individual or unit indicators may include at least one of motor vehicle accident data, dispute resolution, sick leave performance, education and development of the employees, and total retail revenue. By way of non-limiting examples, corporate, unit and individual indicators that may be used consistent with the systems and methods of the present invention are further described in the attached Appendix.

The method may further include generating the composite weighted average of the goal achievement data for the first set of indicators and the second set of indicators includes weighting the goal achievement data for the first set of indicators and the second set of indicators based on at least a level of influence of the at least one entity with respect to the first set of indicators and the second set of indicators. One skilled in the art will appreciate that the composite weighted average may be calculated using other techniques as well.

Figure 5:
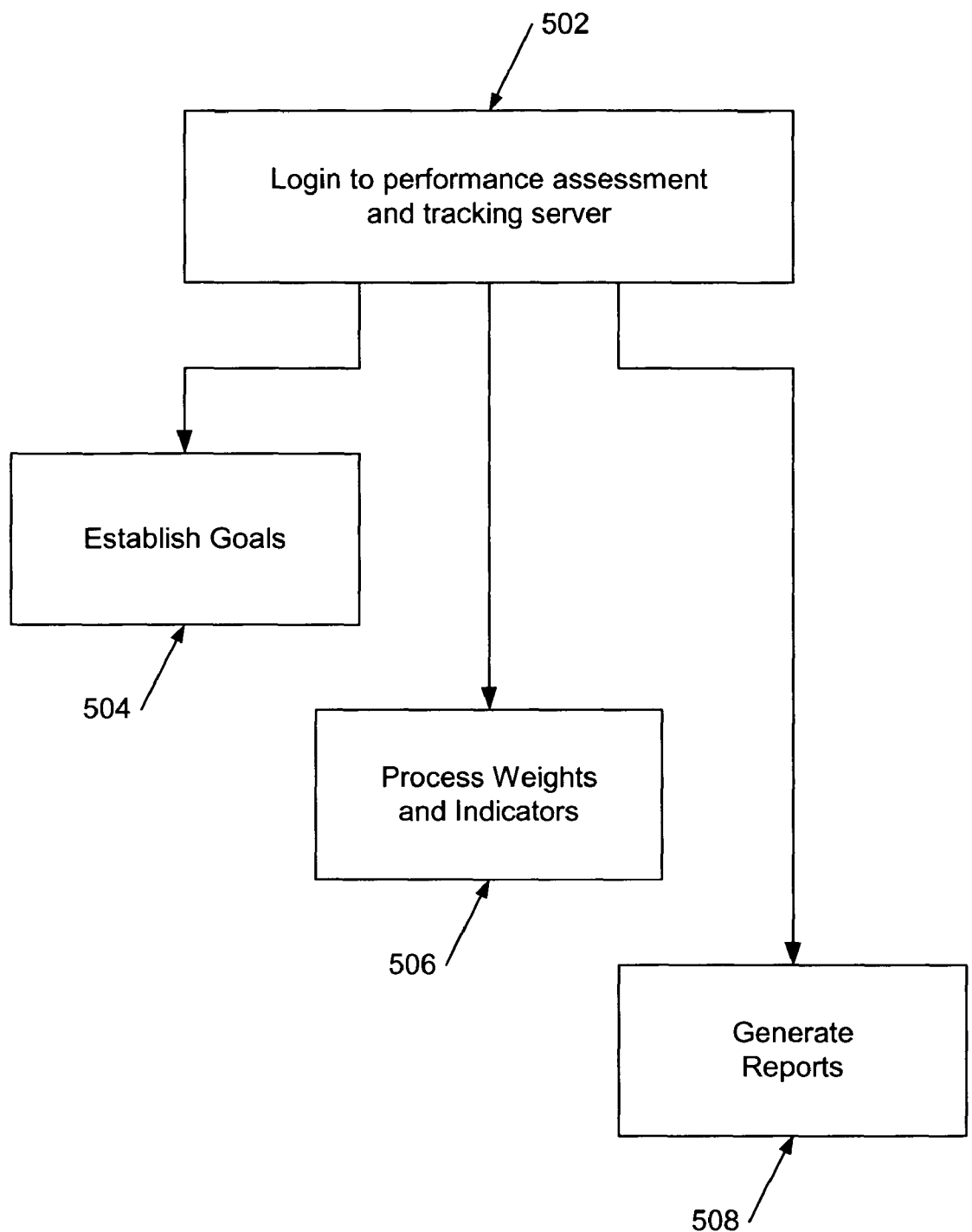
FIG. 5 is a flow diagram illustrating exemplary processes that may be performed, consistent with embodiments of the present invention.

FIG. 5 is a flow diagram illustrating some of the exemplary processes that may be performed, consistent with the present invention. Thus, for example, after logging into performance assessment and tracking server 200 (step 502), a user may establish goals (step 504), process weights and indicators (step 506), or generate reports (step 508). Each of these is discussed in further detail, below, with regards to user terminal screen shots for the various functionalities.

Figure 6:
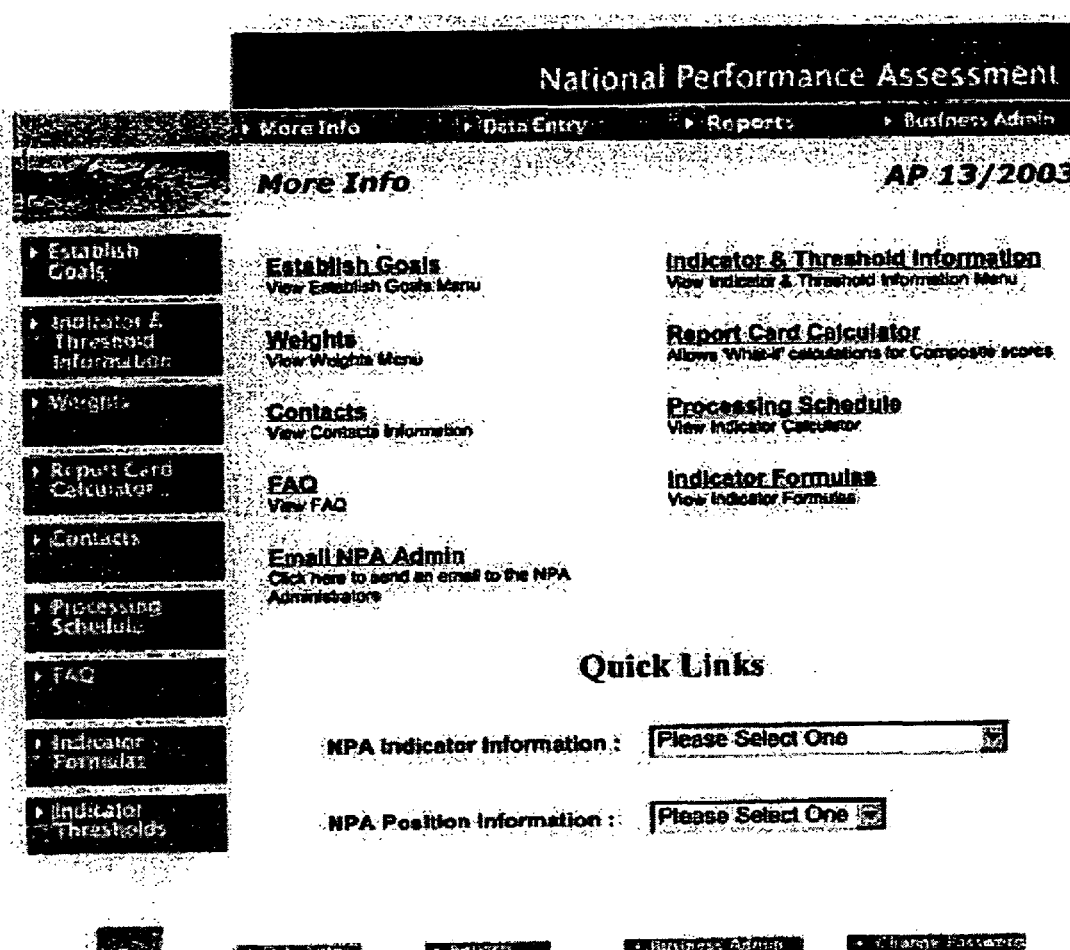
FIG. 6 is a screen shot illustrating exemplary performance assessment and tracking processes, consistent with embodiments of the present invention.

FIG. 6 is a screen shot illustrating exemplary performance assessment and tracking processes, consistent with embodiments of the present invention. In one embodiment, after logging into performance assessment and tracking server, any user of the system may be presented with a screen shown in FIG. 6 allowing the user to select between the various performance assessment and tracking operations. By way of a non-limiting example, such operations may include establishing goals, attaching weights to various indicators associated with the goals, viewing contact information, viewing frequently asked questions (FAQ) files, contacting the performance assessment and tracking system administrators, and so on. Further, the user may also view indicator and threshold information, perform report card calculations, determine processing schedules (i.e., determine when periodic data processing occurs, determine when updated reports will be available, etc.), view indicator formulas and the like. One skilled in the art will appreciate that the screen shot shown in FIG. 6 is merely exemplary and other arrangements or user interfaces may be used to access the operational functionality associated with the systems and methods of the embodiments of the present invention.

Figure 7:
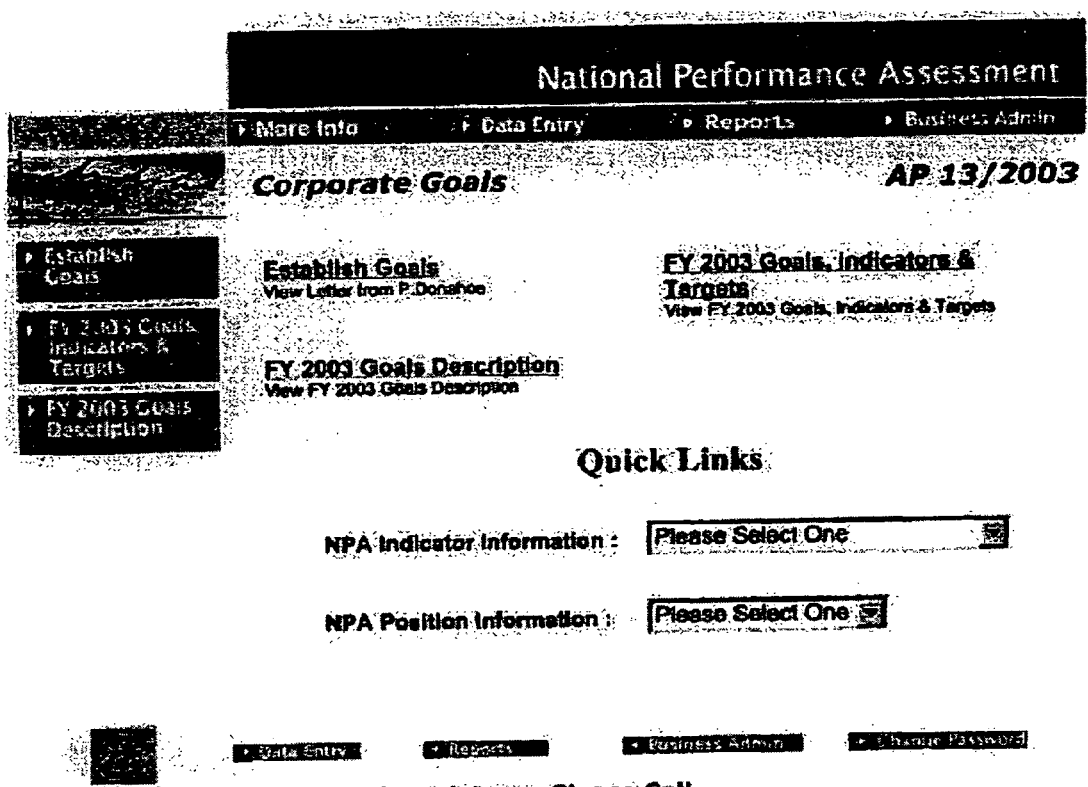
FIG. 7 is a screen shot illustrating exemplary access to goals that may be established, consistent with embodiments of the present invention.

FIG. 7 is a screen shot illustrating exemplary access to goals that may be established, consistent with embodiments of the present invention. Thus, for example, goals may relate to various services and products that an organization offers, such as improvement of service with respect to delivery of priority mail within 2 days. For example, one of the goals may be to improve service offered by the organization in its core areas. Other goals may include enhancing a performance based employee culture, generating revenue, and/or managing costs. Indicators may correspond to variables that may be measured to determine whether the organization is meeting its goals. For example, the U.S. Postal Service may measure service improvement by indicators, such as the percentage of priority mail and/or express mail delivered on time.

Targets may relate to the expected performance for a particular goal or indicator corresponding to a goal for an upcoming time period (e.g., next quarter, next fiscal year, etc.). Targets may be relative, for example, based on an improvement from a previous time period's performance or they may be absolute. Performance of individuals in various positions within the various levels of an organization and/or performance of various regions of an organization may then be represented on a scorecard relative to the goals, indicators and targets, and rated accordingly. For example a rating scale of unacceptable, contributor, high contributor, or exceptional contributor can be used. One skilled in the art will appreciate that a variety of goals, indicators, targets, scorecards and ratings may be used to represent relative performance of the various entities within the organization.

Table 1, below, provides further examples of goals, indicators and targets according to embodiments of the present invention. The examples provided In Table 1 are specific to a performance and assessment tracking system that might be implemented, for example, by the U.S. Postal Service.

TABLE 1

| Goal | Indicator | Target |
| --- | --- | --- |
| Improve Service | Priority Mail On-Time Percentage, 2-day Ground Service | XX % |
| | Priority Mail On-Time Percentage, 2-day Air Service | YY % |
| | Express Mail On-Time Percentage, Next Day Service | XX % |
| | Express Mail On-Time Percentage, Overnight Service | XX % |
| | Express Mail On-Time Percentage, 2-day Service | YY % |
| | Express Mail On-Time Percentage, 3-day Service | YY % |
| Enhance a Performance Based Culture | OSHA Illness and Injury Rate | >Last Year |
| | Employee Satisfaction Survey | >Last Year |
| Revenue | Total National Revenue | >Plan |
| Costs | Total Costs | <Plan |

Figure 8:
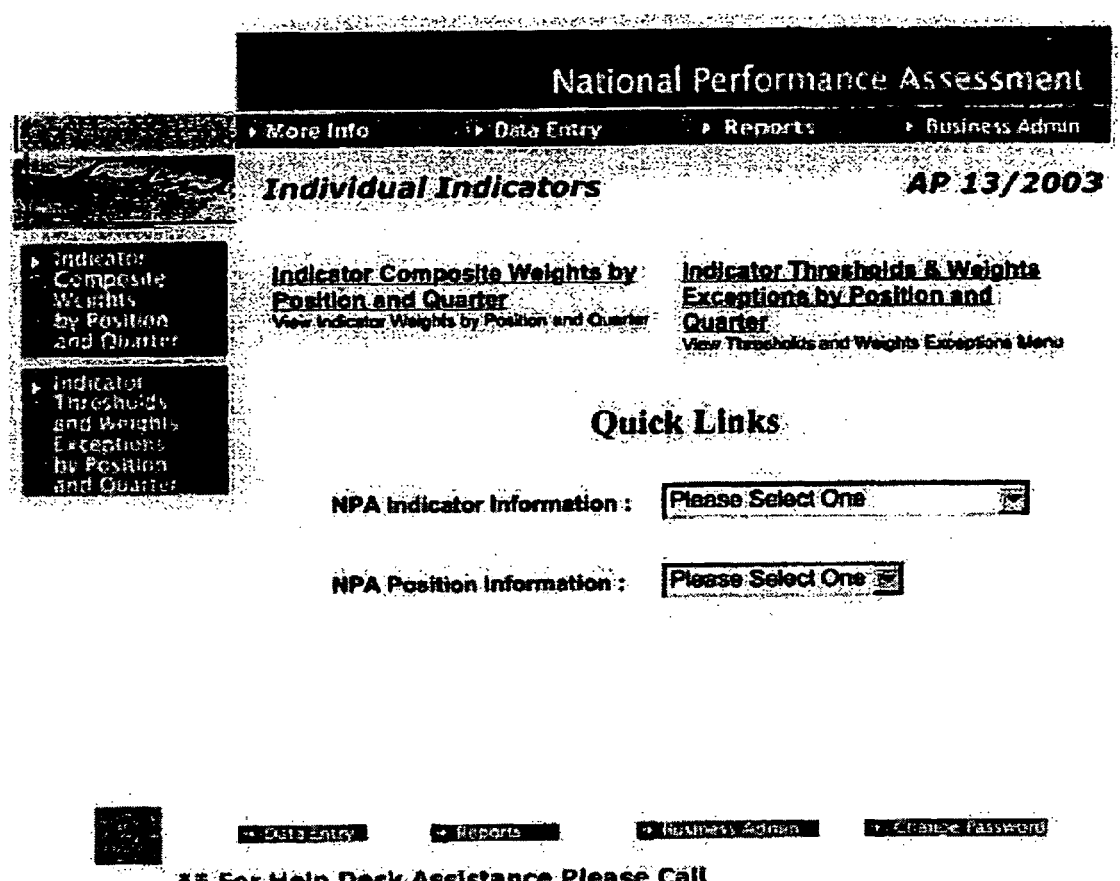
FIG. 8 is a screen shot illustrating exemplary access to individual indicators that may be processed, consistent with embodiments of the present invention.

FIG. 8 is a screen shot illustrating exemplary access to individual indicators that may be processed, consistent with embodiments of the present invention. As shown, this exemplary screen shot can allow a user to select between indicator composite weights by position and quarter or indicator thresholds and weights exceptions by position and quarter. Of course, as will become evident to those of ordinary skill in the art, other selections of indicators, weights, exceptions and time periods can be used. By way of non-limiting examples, corporate, unit and individual indicators with their associated weights and calculation bases are listed in the attached Appendix.

Figure 9:
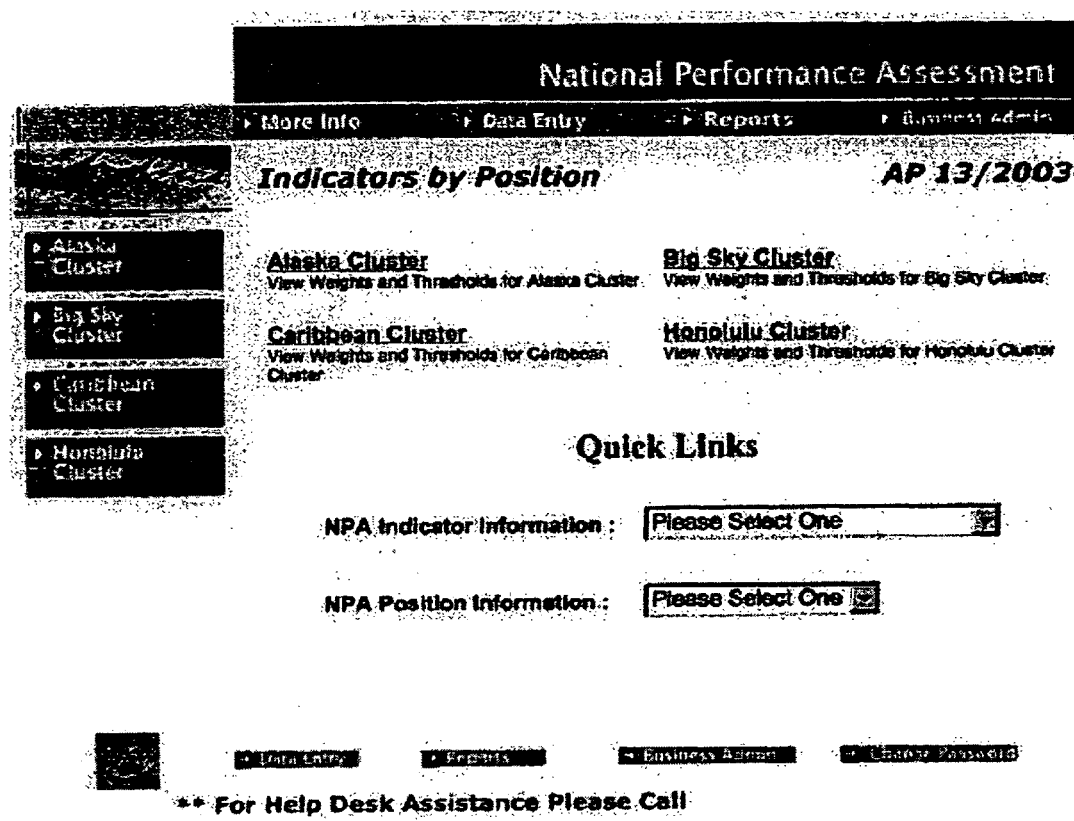
FIG. 9 is a screen shot illustrating exemplary access to indicators by position, consistent with embodiments of the present invention.

FIG. 9 is a screen shot illustrating exemplary access to indicators by position, consistent with embodiments of the present invention. In an embodiment, indicators by position may be accessed based on clusters or groupings of various entities located in different geographic areas. Goals, indicators and targets for a particular cluster may be adjusted based on specific performance related considerations for that particular cluster. In this way, exceptions to nationwide goals, indicators and targets may be provided for certain areas, units, or plants. By way of a non-limiting example, FIG. 9 lists access to indicators by position for the Alaska Cluster, the Big Sky Cluster, the Caribbean Cluster, and the Honolulu Cluster. Thus, in an embodiment, goals, indicators and targets for performance by certain units or positions, such as mail carriers, may be lowered in harsher geographic areas, such as the Alaska Cluster. By way of a non-limiting example, the attached Appendix shows exemplary weights and exceptions that various indicators may have for each relevant unit or position in the Alaska Cluster and the Caribbean Cluster. Thus, for example, a higher level manager, such as a PCES P&D Manager may have a composite performance computed based on 75% corporate indicators and 25% individual or unit indicators. In contrast, other positions may attach equal weight to corporate, unit and individual indicators, or any other combination thereof.

Figure 10:
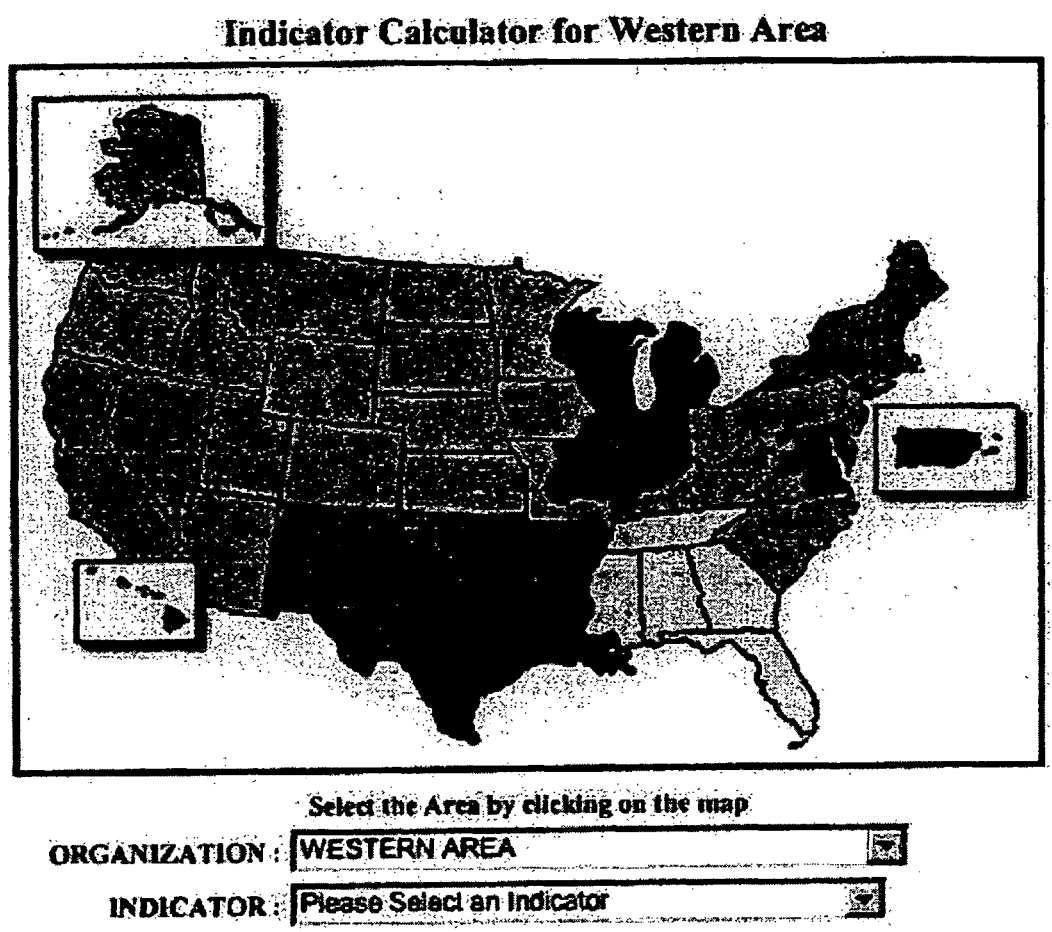
FIG. 10 is a screen shot illustrating exemplary access to an indicator calculator, consistent with embodiments of the present invention.

FIG. 10 is a screen shot illustrating exemplary access to an indicator calculator for a specific geographic area, consistent with embodiments of the present invention. Thus, for example, using the interface shown in FIG. 10, a user (such as a unit manager in the western area) may visualize what their score with respect to a particular indicator would be if they achieve a particular level of performance. Thus, a user may perform what-if scenario calculations. For example, a user may determine how a performance score might be impacted if that user could improve Express Mail delivery performance from 95% to 98%.

Figure 11:
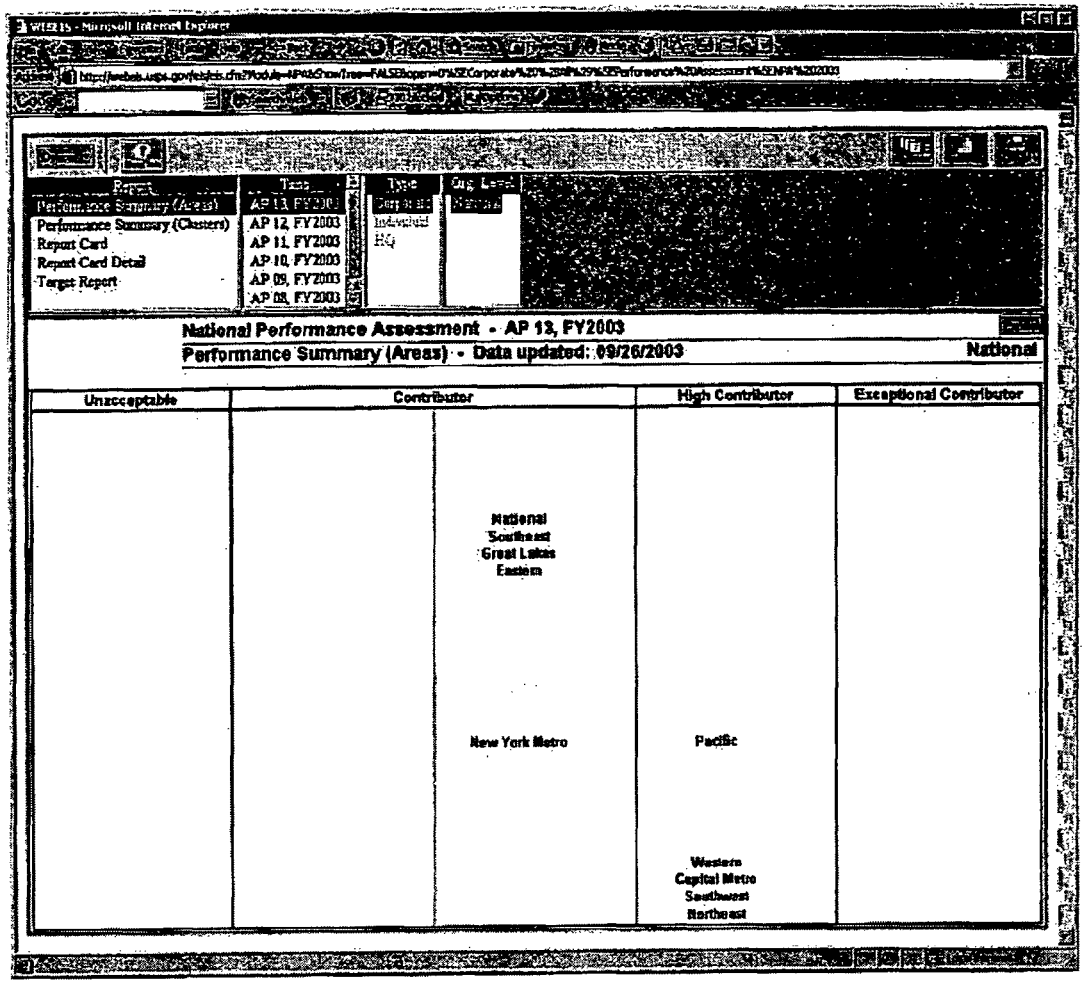
FIG. 11 is a screen shot illustrating an exemplary area performance report, consistent with embodiments of the present invention.

FIG. 11 is a screen shot illustrating an exemplary area performance report, consistent with embodiments of the present invention. Thus, for example, FIG. 11 shows a performance summary or composite for various geographic areas of an entity for a certain time frame. Performance summary or composite may reflect a cumulative weighted average score for the various areas based on performance with respect to various indicators for each of the geographic areas. Thus, this report may provide a snapshot of the relative performance of the post offices in various geographic areas when measured against each other based on standardized indicators of performance. In one embodiment, by clicking the "PowerPoint" button, a user may generate an MS PowerPoint slide including the summary or composite report. One skilled in the art will appreciate that FIG. 11 is exemplary and summary or composite reports for various groups, at various levels, and/or various indicators may be similarly generated.

Figure 12:
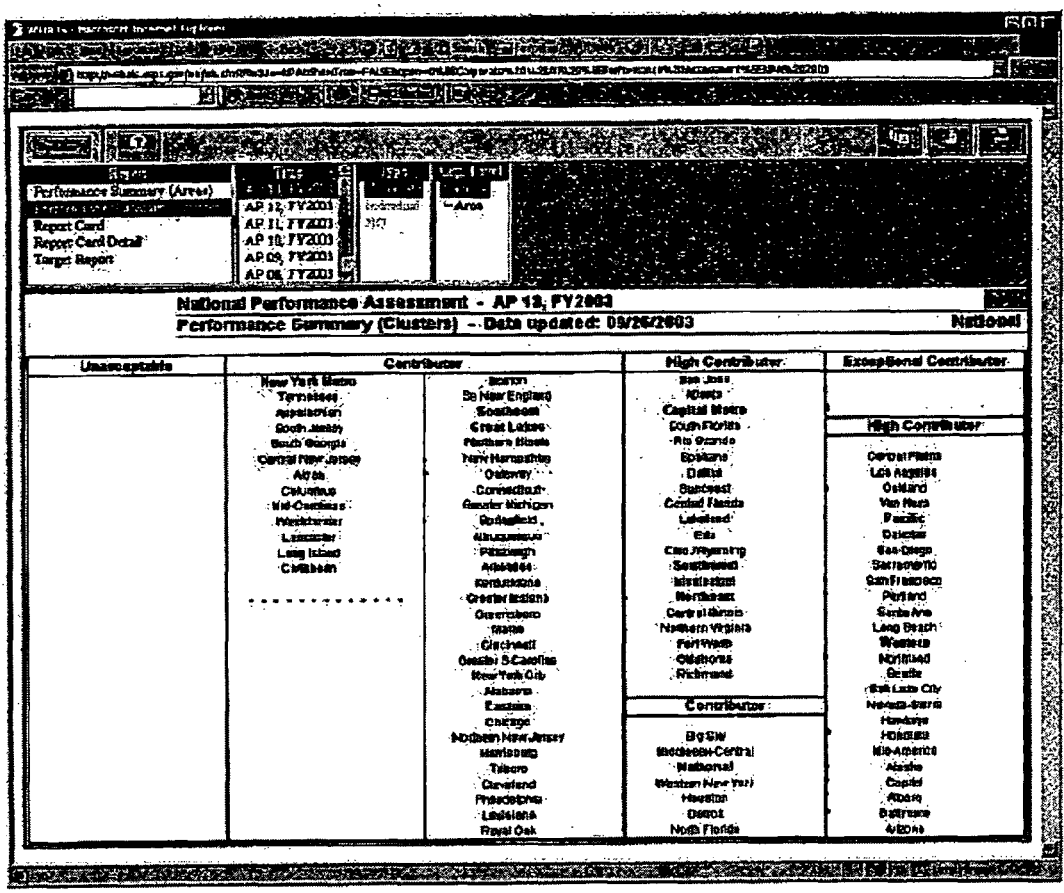
FIG. 12 is a screen shot illustrating an exemplary area performance report at a more detailed level, consistent with embodiments of the present invention.

FIG. 12 is a screen shot illustrating an exemplary area performance report at a more detailed level, consistent with embodiments of the present invention. Thus, for example, the exemplary area performance report shows additional performance data corresponding to the clusters within various geographic areas. One skilled in the art will appreciate that FIG. 12 is exemplary and summary or composite reports for various groups, at various levels, and/or various indicators may be similarly generated.

Figure 13:
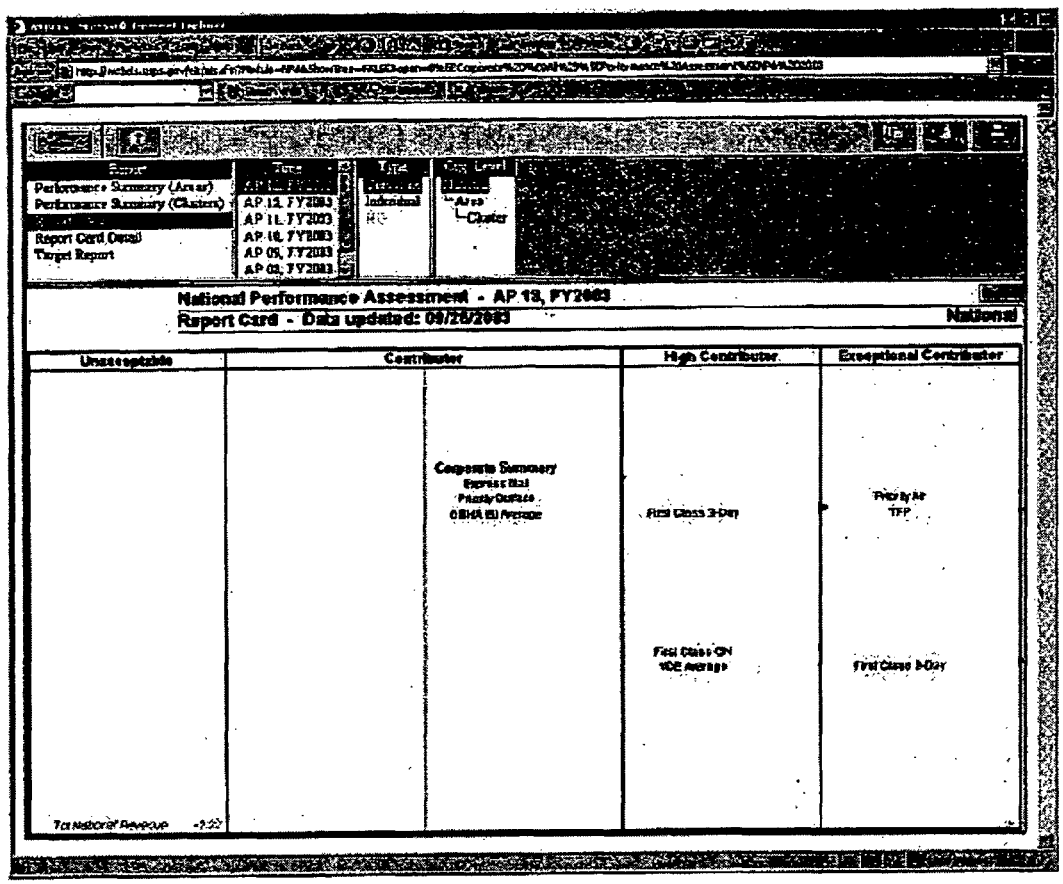
FIG. 13 is a screen shot illustrating an exemplary national level corporate indicators report, consistent with embodiments of the present invention.

FIG. 13 is a screen shot illustrating an exemplary national level corporate indicators report, consistent with embodiments of the present invention. Thus, for example, FIG. 13 shows performance data at the national level in the various categories of services that an organization may provide, such as Express Mail, Priority Surface, and Priority Air. The exemplary report further shows a composite corporate performance score of 9.95 (corporate summary or composite), which falls at the contributor level. One skilled in the art will appreciate that FIG. 13 is exemplary and summary or composite reports for various groups, at various levels, and/or various indicators may be similarly generated.

Figure 14:
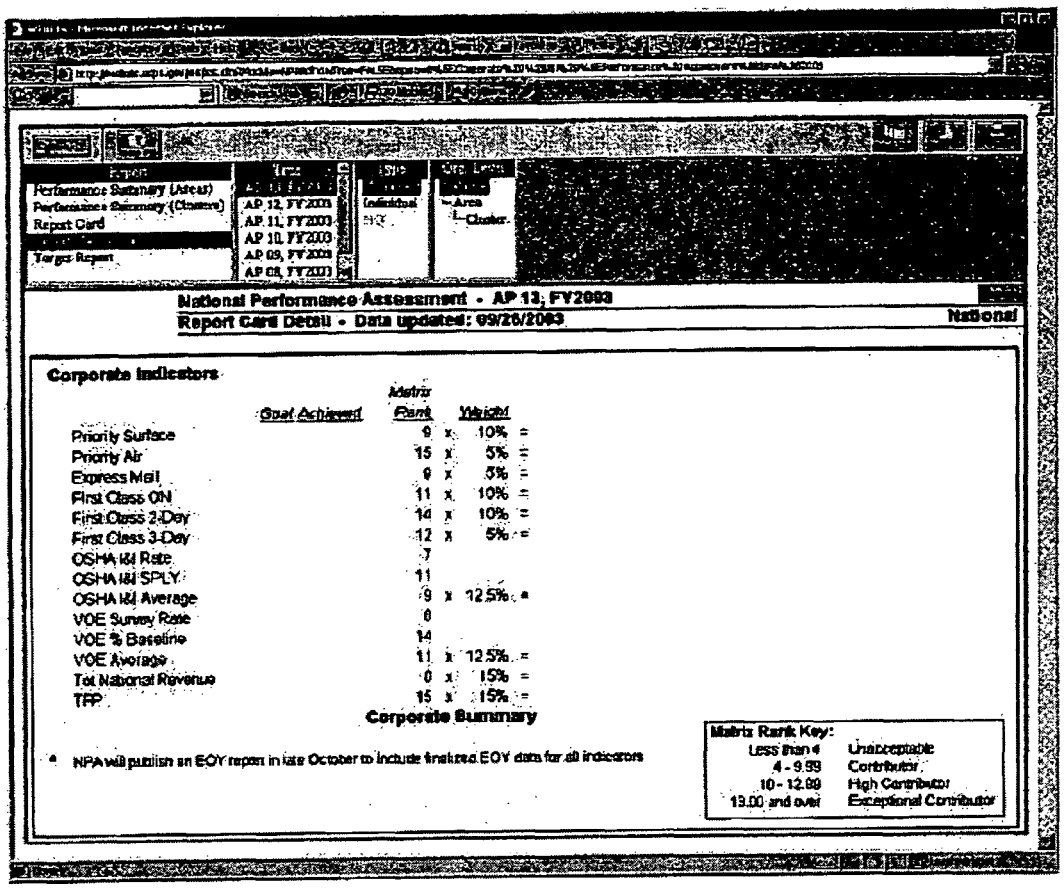
FIG. 14 is a screen shot illustrating factoring of various corporate indicators in determining the summary or composite corporate performance score, consistent with embodiments of the present invention.

FIG. 14 is a screen shot illustrating factoring of various corporate indicators in determining the composite corporate performance score, consistent with embodiments of the present invention. Thus, for example, the composite corporate performance score of 9.95 may be calculated by calculating a weighted average of performance data corresponding to various corporate indicators, such as priority surface, priority air, and express mail corporate indicators. As shown, performance data corresponding to various corporate indicators may be attached different weights and then a weighted average of the weighted data may be obtained. By way of non-limiting examples, any indicators described in the attached Appendix may be used to calculate the composite corporate performance score. One skilled in the art will appreciate that using a weighted average calculation is merely exemplary and other mathematical or computational techniques may also be used consistent with the systems and methods of the present invention.

Figure 15:
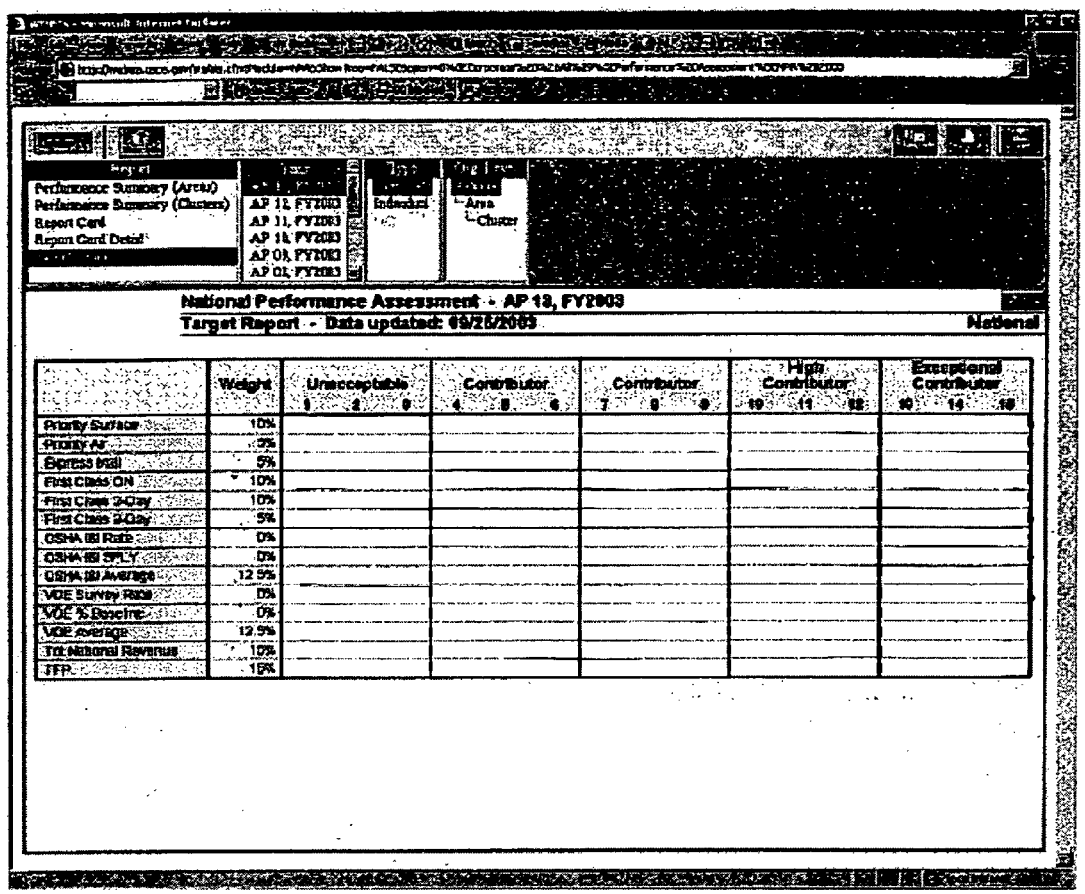
FIG. 15 is a screen shot illustrating an exemplary national level corporate target report, consistent with embodiments of the present invention.

FIG. 15 is a screen shot illustrating an exemplary national level corporate target report, consistent with embodiments of the present invention. Thus, for example, FIG. 15 shows weights attached to various corporate indicators, such as priority surface, priority air, and express mail. Further, the exemplary national level corporate target report shows scores corresponding to various level of performance. Thus, for example, for the priority surface corporate indicator, a score of 92.0 or lower than 92.0 would mean an unacceptable level, whereas a score of 96.0 or above would mean an exceptional contributor level.

Scores for various levels of performance for each indicator may be determined using statistical, artificial intelligence, data modeling, or other analytical/logical techniques. For example, in one embodiment, previous years' data corresponding to various indicators may be used as a basis to set the targets for the current year. Although not shown, a similar report may be generated listing the various individual indicators, the weights attached to the individual indicators, and the scores for each of the individual indicators corresponding to various levels of performance. By way of non-limiting examples, the attached Appendix describes various targets that may be established for the various indicators consistent with the systems and methods of the present invention.

Figure 16:
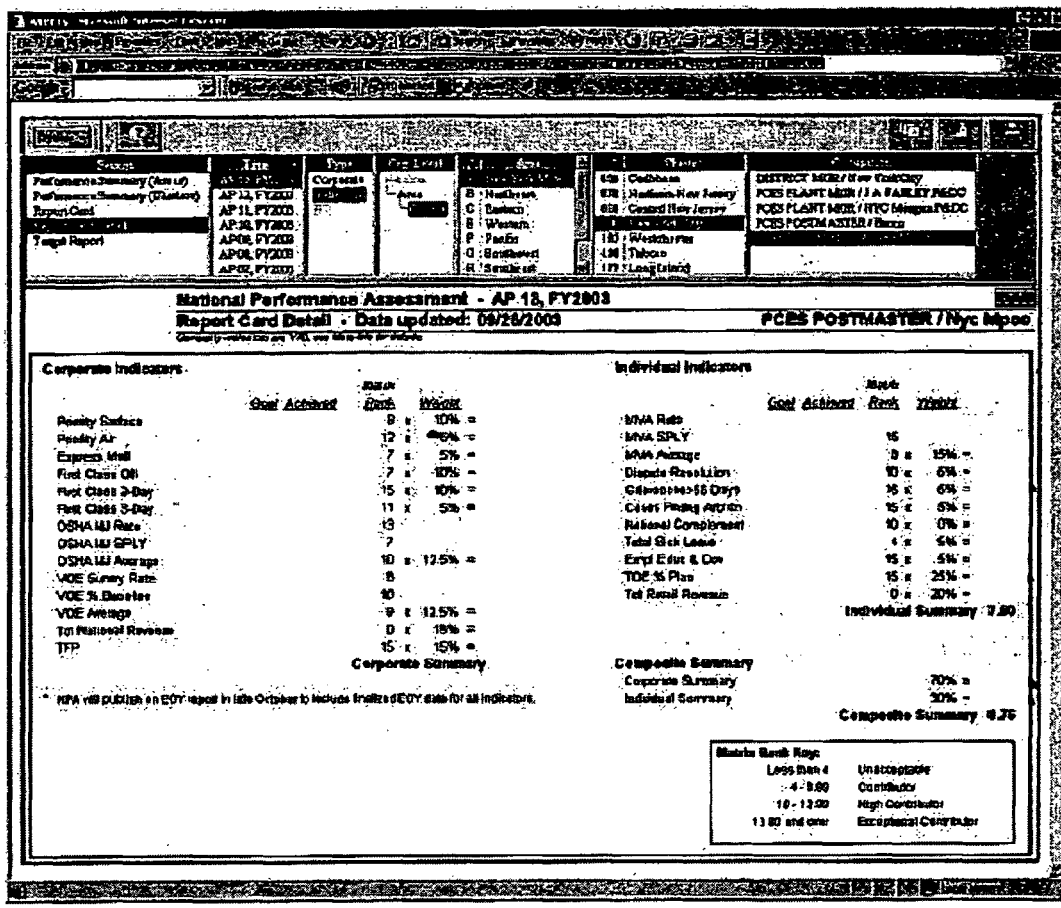
FIG. 16 is a screen shot illustrating an exemplary report card for a particular position based on corporate and individual indicators corresponding to the position, consistent with embodiments of the present invention.

FIG. 16 is a screen shot illustrating an exemplary report card for a particular position (or an employee) based on corporate, unit and individual indicators corresponding to the position (or the employee), consistent with embodiments of the present invention. By way of non-limiting examples, the attached Appendix describes various targets that may be established for the various indicators to produce the various report cards consistent with the systems and methods of the present invention.

Other embodiments of the invention will be apparent to those skilled in the art from consideration of the specification and practice of the invention disclosed herein. It is intended that the specification and examples be considered as exemplary only.

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures. It is intended that the scope of the appended claims include such changes and modifications.

What is claimed is:

1. A computer-implemented method for assessing operational and functional performance, the method comprising steps performed by a computer of:
   compiling, in memory, performance data for at least one entity, the performance data corresponding to a plurality of indicators, each indicator corresponding to at least one goal category within a plurality of goal categories for an organization, the plurality of goal categories including a corporate goals category, a unit goals category and a position goals category, wherein each goal category includes at least two indicators;
   scaling the compiled performance data corresponding to the plurality of indicators for the at least one entity based on at least one target for expected performance with respect to at least one goal category;
   weighting the scaled performance data corresponding to the plurality of indicators for the at least one entity, wherein weighting the scaled performance data includes:
      performing a plurality of first weightings by multiplying, within each goal category, the scaled performance data of each indicator by a corresponding first multiplier, resulting in a plurality of weighted indicator scores for each goal category;
      summing, within each goal category, the weighted indicator scores, resulting in summed performance data; and
      performing a second weighting of the plurality of goal categories by multiplying, for each goal category, the summed performance data by a second multiplier that corresponds to that goal category, resulting in a separate total weighted goal score for each goal category, wherein one of the plurality of goal categories is weighted differently than another of the plurality of goal categories;
   adding the total weighted goal scores of the categories to generate a total card score;
   generating a performance scorecard for the at least one entity based on the total indicator scores, the total weighted goal scores, and the total card score;
   allowing a plurality of users direct access to the performance scorecard after it is generated; and
   calculating what a score for at least one indicator would be in a particular geographic area if the at least one entity were to achieve a particular level of performance in the particular geographic area, wherein at least one of the plurality of users has access to the score after it is calculated.

2. The method of claim 1, wherein:
   the step of compiling includes determining a performance level for the compiled performance data corresponding to each one of the plurality of indicators; and
   the step of scaling includes mapping each performance level onto a common scoring scale.

3. The method of claim 2, further comprising the step of:
   measuring the plurality of indicators corresponding to the corporate goals category at least at a national level, an area level, and a cluster level.

4. The method of claim 2, further comprising the step of:
   measuring the plurality of indicators corresponding to the unit goals category at least at a plant level, a post office level, and a district level.

5. The method of claim 2, further comprising the step of:
   measuring the plurality of indicators corresponding to the position goals category at a specific position level.

6. The method of claim 1, wherein the step of generating the performance scorecard includes:
   generating a plurality of first scores, each one based on one of the plurality of first weightings; and
   generating the scorecard based on the plurality of first scores and on the second weighting.

7. The method of claim 1, wherein the step of weighting the scaled performance data is based on a plurality of weighting factors, each weighting factor corresponding to a priority of one of the plurality of indicators relative to the remaining plurality of indicators corresponding to the at least one goal category.

8. The method of claim 1, further comprising the step of:
   adjusting a pay of at least one of the plurality of users based on the performance scorecard.

9. The method of claim 1, wherein the step of allowing further includes:
   allowing the plurality of users direct access to the compiled performance data and the scaled performance data after they are compiled and scaled, respectively.

10. The method of claim 1, wherein each of the steps is performed utilizing a widely dispersed and networked, enterprise computer system.

11. A system for assessing operational and functional performance, the system comprising:
   a processor that executes instructions to perform functions including:
      compiling performance data for at least one entity, the performance data corresponding to a plurality of indicators, each indicator corresponding to at least one goal category within a plurality of goal categories for an organization, the plurality of goal categories including a corporate goals category, a unit goals category and a position goals category, wherein each goal category includes at least two indicators;
      scaling, the compiled performance data corresponding to the plurality of indicators for the at least one entity based on at least one target for expected performance with respect to at least one goal category;
      weighting the scaled performance data corresponding to the plurality of indicators for the at least one entity, wherein weighting the scaled performance data includes:
         performing a plurality of first weightings by multiplying, within each goal category, the scaled performance data of each indicator by a corresponding first multiplier, resulting in a plurality of weighted indicator scores for each goal category;

summing, within each goal category, the weighted indicator scores, resulting in summed performance data; and performing a second weighting of the plurality of goal categories by multiplying, for each goal category, the summed performance data by the second multipliers, resulting in a separate total weighted goal score for each goal category, wherein one of the plurality of goal categories is weighted differently than another of the plurality of goal categories;

calculating a total card score by adding the total weighted goal scores of the goal categories; and calculating what a score for at least one indicator would be in a particular geographic area if the at least one entity were to achieve a particular level of performance in the particular geographic area; and a terminal that is communicatively coupled to the processor, the terminal generating a performance scorecard for the at least one entity based on the total indicator scores, the total weighted goal scores, and the total card score, wherein a plurality of users can access the performance scorecard substantially immediately after it is generated.

12. The system of claim 11, wherein:
the compiling includes determining a performance level for the compiled performance data corresponding to each one of the plurality of indicators; and
the step of scaling includes mapping each performance level onto a common scoring scale.

13. The system of claim 11, wherein the plurality of indicators are measured at different levels for different geographic categories.

14. The system of claim 13, wherein the functions performed by the processor further include measuring the plurality of indicators corresponding to the corporate goals category at least at a national level, an area level, and a cluster level.

15. The system of claim 13, wherein the functions performed by the processor further include measuring the plurality of indicators corresponding to the unit goals category at least at a plant level, a post office level, and a district level.

16. The system of claim 13, wherein the functions performed by the processor further include measuring the plurality of indicators corresponding to the position goals category at a specific position level.

17. The system of claim 11, wherein generating the performance scorecard includes:
generating a plurality of first scores, each one based on one of the plurality of first weightings; and
generating the scorecard based on the plurality of first scores and on the second weighting.

18. The system of claim 11, wherein weighting the scaled performance data is based on a plurality of weighting factors, each weighting factor corresponding to a priority of one of the plurality of indicators relative to the remaining plurality of indicators corresponding to the at least one goal category.

19. The system of claim 11, the functions performed by the processor further include:
adjusting a pay of at least one of the plurality of users based on the performance scorecard.

20. The system of claim 11, further comprising an interface for connecting to a network, the interface being communicatively coupled to the processor and allowing the plurality of users direct access to the compiled performance data and the scaled performance data after they are compiled and scaled, respectively.

21. The system of claim 11, wherein the terminal causes the processor to perform the functions by communicating with the processor over a widely dispersed and networked, enterprise computer system.

22. A computer-implemented method for assessing performance of at least one entity within an organization based on a first set of indicators corresponding to a first set of organizational goals and a second set of indicators corresponding to a second set of organization goals, each indicator reflecting performance of the at least one entity, the method comprising steps performed by a computer of:

compiling goal achievement data for the first and second sets of indicators associated with the at least one entity;
storing the goal achievement data in memory;
scaling the compiled goal achievement data corresponding to the at least one entity based on at least one target for expected performance with respect to at least one goal category;
weighting the scaled goal achievement data for the first set of indicators relative to each other by multiplying the scaled performance data of the first set of indicators with a first set of multipliers corresponding to the first set of indicators;
weighting the scaled goal achievement data for the second set of indicators relative to each other by multiplying the scaled performance data of the second set of indicators with a second set of multipliers corresponding to the second set of indicators;
weighting the first and second sets of organization goals relative to each other by multiplying the weighted scaled achievement data for the first set of indicators by a first goal multiplier corresponding to the first set of organizational goals, and by multiplying the weighted scaled achievement data for the second set of indicators by a second goal multiplier corresponding to the second set of organizational goals;
generating a composite goal achievement data based on the weighted first set of indicators, the weighted second set of indicators and the weighted first and second sets of organization goals;
allowing a plurality of users direct access to the composite goal achievement data after it is generated; and
calculating what a score for at least one indicator would be in a particular geographic area if the at least one entity were to achieve a particular level of performance in the particular geographic area, wherein at least one of the plurality of users has access to the score after it is calculated.

23. A computer-implemented method for comparing a relative performance of a first and second entity within an organization, the first and second entities being different entities, the method comprising steps performed by a computer of:

compiling first and second performance data for the first and second entity, respectively, the first and second performance data corresponding to a plurality of indicators, each indicator corresponding to at least one goal category for the organization, wherein each goal category includes at least two indicators;
storing the first and second performance data in memory;
scaling the compiled first and second performance data corresponding to the plurality of indicators for the first and second entity, respectively, and based on at least one target for expected performance with respect to at least one goal category;
weighting the scaled first and second performance data corresponding to the plurality of indicators for the first and second entity, respectively;

multiplying the first performance data by a multiplier corresponding to the goal category that the first performance data corresponds to;

weighting the first and second scorecards differently based on different geographic regions, wherein a first geographic region associated with the first entity corresponds to a different weighting than a second geographic region that is associated with the second entity;

calculating what a score for at least one indicator would be in a particular geographic area if the at least one entity were to achieve a particular level of performance in the particular geographic area;

generating a first performance scorecard for the first entity and a second performance scorecard for the second entity, based on the weighted first and second performance data, respectively;

displaying the first performance scorecard separately from the second performance scorecard;

producing a comparison scorecard based on the generated first and second performance scorecards, the comparison scorecard containing a comparison of the weighted first performance data and the second performance data, wherein the first and second scorecards are not available on the same screen but the comparison scorecard compiles data from the first and second scorecards onto the same screen; and allowing a plurality of users direct access to the comparison scorecard after it is produced.

24. The method of claim 23, wherein the at least one goal category includes a plurality of goal categories including a corporate goals category, a unit goals category and a position goals categories.

25. The method of claim 24, wherein the step of weighting the scaled first and second performance data includes:

performing a plurality of first weightings, each one weighting certain of the plurality of indicators corresponding to one of the plurality of goal categories for the first entity;

performing a plurality of second weightings, each one weighting certain of the plurality of indicators corresponding to one of the plurality of goal categories for the second entity;

performing a third weighting of the plurality of goal categories for the first entity; and performing a fourth weighting of the plurality of goal categories for the second entity.

26. The method of claim 25, wherein the step of generating the first and second performance scorecard includes:

generating a plurality of first scores for the first entity, each one based on one of the plurality of first weightings;

generating a plurality of second scores for the second entity, each one based on one of the plurality of second weightings;

generating the first scorecard based on the plurality of first scores and on the third weighting; and generating the second scorecard based on the plurality of second scores and on the fourth weighting.

27. The method of claim 23, further comprising the step of:

adjusting a pay of at least one of the plurality of users based on the first and second performance scorecards and on the comparison scorecard.

28. The method of claim 23, wherein each of the steps is performed utilizing a widely dispersed and networked, enterprise computer system.

* * * * *